United States Patent
Gutierrez et al.

(10) Patent No.: US 6,934,087 B1
(45) Date of Patent: Aug. 23, 2005

(54) FIBER OPTIC COLLIMATOR AND COLLIMATOR ARRAY

(75) Inventors: Roman C. Gutierrez, La Crescenta, CA (US); Thomas R. Vanzandt, Redondo Beach, CA (US); Christopher I. Walker, Pasadena, CA (US); Edouard G. H. Schmidtlin, Sherman Oaks, CA (US); Robert J. Calvet, Pasadena, CA (US)

(73) Assignee: Siimpel Corporation, Arcadia, CA (US)

( * ) Notice: Subject to any disclaimer, the term of this patent is extended or adjusted under 35 U.S.C. 154(b) by 0 days.

(21) Appl. No.: 10/669,676

(22) Filed: Sep. 23, 2003

Related U.S. Application Data

(60) Provisional application No. 60/413,979, filed on Sep. 25, 2002.

(51) Int. Cl.[7] ................................................ G02B 6/26
(52) U.S. Cl. ......................... 359/641; 385/31; 385/34; 385/60; 385/78
(58) Field of Search ............................... 385/31–34, 60, 385/74, 76–78, 80; 359/641, 637

(56) References Cited

U.S. PATENT DOCUMENTS

| | | | |
|---|---|---|---|
| 6,179,483 B1 * | 1/2001 | Kanazawa | 385/93 |
| 6,587,618 B2 * | 7/2003 | Raguin et al. | 385/33 |
| 6,625,352 B2 * | 9/2003 | Chang | 385/33 |
| 2002/0131699 A1 * | 9/2002 | Raguin et al. | 385/33 |

FOREIGN PATENT DOCUMENTS

WO  WO 01/53860 A2  7/2001

* cited by examiner

*Primary Examiner*—Hung Xuan Dang
*Assistant Examiner*—Joseph Martinez
(74) *Attorney, Agent, or Firm*—MacPherson Kwok Chen & Heid LLP; Tom Chen

(57) ABSTRACT

A fiber optic collimator comprises an optical fiber with an angled end face, a ferrule and a plano-convex lens. An end portion of the optical fiber is inserted in the ferrule. The plano-convex lens collimates a beam of light from the optical fiber.

19 Claims, 2 Drawing Sheets

FIBER OPTIC COLLIMATOR AND COLLIMATOR ARRAY

CLAIM OF PRIORITY

The present application claims priority to co-owned U.S. Provisional Patent Application No. 60/413,979, entitled "Fiber Optic Collimator and Collimator Array," filed on Sep. 25, 2002.

BACKGROUND

A collimator is an optical device that converts light traveling within an optical fiber into a nearly collimated (pencil) beam of light propagating in free space. Arrays of collimators may have many applications in fiber-optic networks. Among them are digital, free-space, optical switches in which an input collimator is used to project a directed light beam from a fiber into free-space. This collimated beam may be aimed onto one or more moveable mirrors, which reflect the light to a chosen output collimator. The coupling efficiency between the input and output collimators may be strongly dependent on the angular accuracy with which the collimators are pointed. Thus, digital, free-space optical switches may require sets of collimators, i.e., collimator arrays, with very precise pointing accuracy. For state-of-the-art, digital, free-space optical switches, single collimator pointing accuracy of better than 150 microradians may be required. In order to provide flexibility in design and manufacturing, it is often desirable to adjust the collimator angle over a relatively large range (often one to a few degrees) with the above accuracy. An associated specification is the position accuracy, or "centration," of the collimator. Centration refers to the positional accuracy of the center of the collimated beam relative to some reference point on the collimator. Even a precisely pointed (in angle) collimator pair may exhibit undesired optical coupling loss if their beam positions do not overlap precisely. It may be desirable to have a collimator with a very small centration error. For state-of-the-art, digital, free-space, optical switches, beam centration of better than 10 microns may be required.

A separate factor in coupling efficiency is the quality of the free-space beam emerging from the collimator. The collimator should not introduce significant aberrations because such defects will reduce coupling.

Another important attribute of a fiber optic collimator is to maintain the directionality of the light propagating in the fiber. An ideal collimator should have negligible back reflection. Typically, back reflection intensities should be 60 dB below that of the incident power.

In PCT International Publication Number WO 01/53860 A2, "PRECISION FIBER OPTIC COLLIMATOR," Foster and Romanovsky describe the use of a plano-convex lens to collimate the beam emerging from an angle polished fiber. This reference is directed specifically toward so-called "analog" optical switches where the requirement for collimator alignment is simply to project the beam to the center of a specific moveable mirror. Because of the architecture of the switch (and the analog nature of its mirrors, which allow the mirror angle to be controlled effectively over a continuum of angles), any inherent beam position errors can be compensated by an adjustment of the beam angle, and vice-versa. The result is a collimator in which neither the angle, nor the position of the beam are accurately aligned, which is unsatisfactory for digital, free-space optical switches. This reference does not address a design in which both the angle and the position of the collimator are aligned.

A major disadvantage with the Foster and Romanovsky reference is that the angled surface of the fiber is not parallel to the plano surface of the lens. This leads to a complex alignment process, involving rotation of the fiber along its axis and/or rotation of the lens about its axis and/or translation of both the lens and fiber along their respective axes. In short, adjustment in as many as four degrees-of-freedom is required to align the beam in angle about two axes. While this approach allows for alignment of the pointing angle of the collimated beam relative to the outside of the fixture, it does not provide for a method to reduce the position error (centration error) below that of the plano-convex lens. In many real-world applications, even the centration error of lenses manufactured to state-of-the-art tolerances (tens of microns) is sufficiently large to lead to unacceptably high coupling losses.

A separate drawback of the Foster and Romanovsky reference is the finite gap between the fiber end and the plano surface of the lens. This gap is significantly larger than the typical Rayleigh range associated with the effective fiber aperture. Because of this, a spherical wavefront illuminates the plano surface of the lens. This leads to a substantial amount of spherical aberration, which degrades the quality of the beam.

SUMMARY

The present application relates to a fiber optic collimator and to arrays of such collimators. An embodiment of the collimator may comprise low cost components. The collimator may comprise a low cost, plano-convex lens and an angle-polished fiber. The collimator may have low back-reflection and low aberrations using a simplified assembly and alignment process. In one embodiment, a single lens is positioned and attached to the surface of an angle-polished fiber terminator to construct a single collimator. The collimator may provide a scalable design by which large arrays of collimators can be fabricated. In another embodiment, a plurality of lenses are positioned and attached to the surface of a fiber terminator array to construct a collimator array.

The plano-convex lens may be designed to have a near-zero gap between the fiber end face and the piano surface of the lens. This attribute may be referred to as "zero back focal length" or "butt-coupled." The near-zero gap between the fiber and the plano surface of the lens can be maintained through an axial loading force and an adhesive. With the proper choice of lens material (index), refraction of light propagating from the fiber into the lens may be reduced to the point that the output beam angle is nearly identical to the fiber angle. As a result, the clocking (rotation about its axis) alignment of both the fiber and the lens may be unimportant. The beam pointing angle can be adjusted along two axes by sliding the lens laterally (along the same two axes) with respect to the fiber end face, which is parallel to the lens face. This requires only a two degree-of-freedom linear adjustment along a planar sliding contact. The tip, tilt, and clocking of the lens with respect to the fiber may be largely unimportant. Thus, the collimator may provide accurate alignment of a collimator beam pointing angle using a reduced degree-of-freedom adjustment of its subcomponents.

The collimator may reduce or eliminate a contribution of the inherent lens centration error to the overall position error of the aligned free-space collimated beam. The result is a collimator in which both the beam angle and the beam position are carefully aligned. The beam position may be defined primarily by the position of the fiber, independent of the centration of the lens. Accurate positioning of fibers is enabled by some standard assemblies, such as fiber ferrules, which maintain very tight dimensional tolerances between the fiber core and their exterior surfaces. Because of this, beam position accuracies of a few microns can be achieved. The resulting collimator is thus precisely aligned in both position and angle.

The collimator may exhibit a sufficient beam quality to reduce or minimize aberrations resulting from the plano surface of a lens. The gap between a lens and a fiber is sufficiently small (e.g., significantly less than the Rayleigh range corresponding to the fiber) that the gap does not introduce significant aberrations in a collimated beam. Specifically, the radius of curvature of the beam propagating across the piano surface of the lens may be very large (the beam has a nearly planar wavefront). As a result, the contribution of this surface of the lens to spherical aberration is minimal. Additionally, the magnitude of differential refraction (differences in refraction across the entire wavefront) across fiber-lens gap is rendered insignificant by the small magnitude of this gap. This reduces the contribution of the piano surface to comatic aberration in the beam. The result is a collimated beam of significantly higher quality using plano-convex lenses than is achieved by prior designs.

In one embodiment, implementing an optical collimator with high angular and lateral precision involves: providing a planar, angled fiber termination, placing a plano-convex lens on the planar fiber termination such that the air gap between the planar side of the lens and the fiber end face is small, adjusting the lateral position of the lens parallel to the plane of the lens-fiber surface to achieve the desired pointing angle for the beam, and fixing the lens position.

In another embodiment, implementing a plurality of optical collimators with high angular and lateral precision involves: providing an array of accurately positioned, angled polished fiber terminations, placing at least one planoconvex lens on the fiber termination array such that the planar side of each lens is at a close distance to the fiber end faces, adjusting the lateral positions of each lens parallel the plane of the lens-fiber surface to achieve the desired pointing angles for the beams, and fixing the lens positions.

In another embodiment, implementing an optical collimator or a plurality of optical collimators can involve a lateral alignment (transverse to the fiber axis) of the planoconvex lens with respect to the fiber end face so as to minimize optical aberrations in the collimated beam. Specifically, for a given plano-convex lens, there exists a specific lateral position for the lens at which point the effects of spherical and comatic aberrations are to a large degree cancelled. This position may provide a collimated beam that is of very high optical quality.

In another embodiment, implementing an optical collimator or a plurality of optical collimators can involve using anti-reflection (AR) coatings on the fiber termination and/or the planar side of the lens and/or the convex side of the lens. Such coatings will reduce Fresnel reflections at each of the solid-air interfaces, leading to improved coupling efficiency, and reduced back reflection, of the collimator or collimators.

In another embodiment, implementing an optical collimator or plurality of optical collimators can involve filling entirely the small gap between the fiber termination and the planar side of the lens, with a transparent material. This material may include one of various controlled index materials, which will help to mitigate the effects of any index of refraction mismatch between the fiber and the lens. Among the benefits of this is the reduction of any Fresnel reflections from the fiber-air and air-lens interface. Reducing such reflections will improve the coupling efficiency and it will reduce the back reflection of the collimator or collimators.

In another embodiment, the gap between the fiber and the lens can be adjusted by some actuation. The gap may be adjusted to modify optical aberrations, which would affect optical coupling. Adjustment of this gap may also modify the wavelength dependence of the optical coupling. Such wavelength dependence may result from, for example, resonant cavity effects between the fiber end face and the plano surface of the lens.

Details one or more implementations are set forth in the accompanying drawings and the description below. Other features and advantages may be apparent from the description, drawings and/or claims.

DETAILED DESCRIPTION

Figure 1:
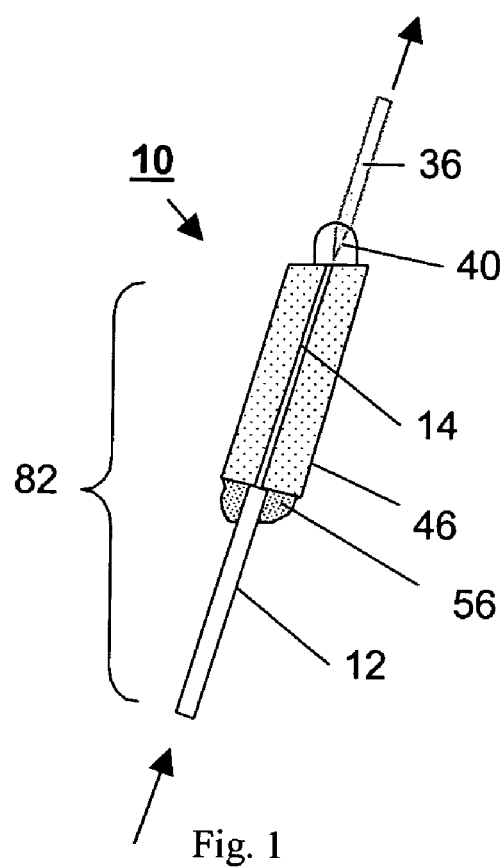
FIG. 1 illustrates a single collimator according to an embodiment of the present application.
Figure 2:
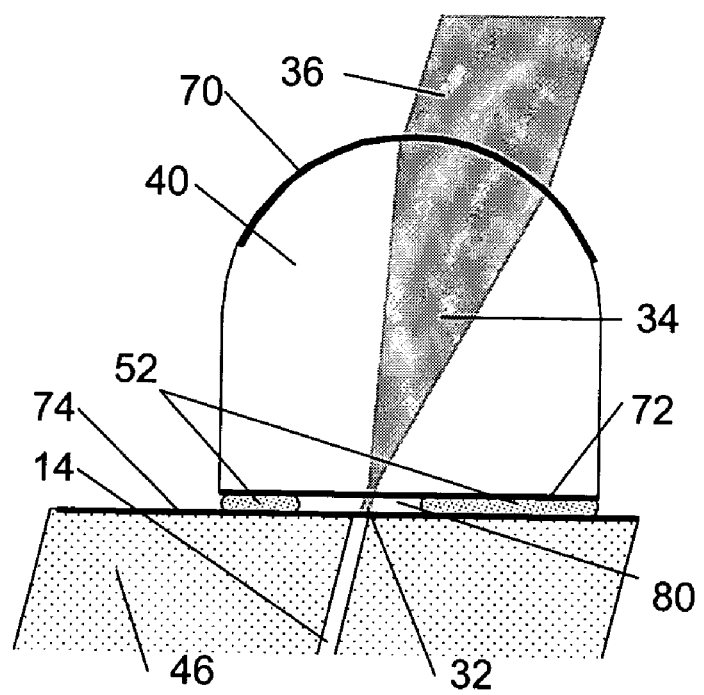
FIG. 2 is a close-up illustration of the single collimator of FIG. 1.

FIGS. 1 and 2 illustrate a single collimator 10 according to an embodiment of the present application. The collimator 10 converts light traveling through an optical fiber 14 into a nearly collimated (pencil) beam 36. The collimator 10 may also be called a beam expander since it expands a light beam coming out of a distal end of the fiber 14 (FIG. 2) into a much larger diameter beam 36. The collimator 10 comprises a fiber termination 82 (FIG. 1) and a lens 40. The fiber termination 82 is made by stripping a buffer 12 from the end of a fiber 14, inserting the end of the fiber 14 into a ferrule 46, gluing the fiber 14 to the ferrule 46 using adhesive 56, cleaving off the distal end of the fiber 14, and polishing the end of the fiber 14 and ferrule 46 at a desired angle. A minimum angle, e.g., eight degrees, is chosen to reduce back reflection from the fiber end face to below an acceptable level. The distal ends of the fiber 14 and ferrule 46 are coated with an anti-reflection (AR) coating 74. The ferrule 46 may be a part of a fiber optic connector (such as an FC/PC connector) or it may be separate. Small drops of adhesive 52 are applied to the end of the ferrule 46, around its periphery, making sure not to cover the distal end of the fiber 14. The ferrule 46 may have a ridge or trench (not shown) around the fiber, in order to prevent adhesive from entering the core area of the fiber 14. The lens 40, which is AR coated on both sides 70 and 72, is placed over the fiber end 14, in contact with the glue 52. The lens 40 is pushed down to make the gap 80 between the fiber 14 and lens 40 as small as possible.

The lens 40 shown in FIGS. 1 and 2 may be a simplified illustration of a plano-convex lens. The shape of the lens 40 may be different from what is shown to provide for mechanical interfaces on a non-optical surface to manipulate the lens 40 during assembly.

The lateral position of the lens 40 (horizontally along the distal surface of the ferrule 46) may be adjusted to obtain the desired beam pointing angle. The beam pointing may be monitored using, for example, a position sensor, like a quad-cell detector, or by measuring/monitoring coupling efficiency into a separate collimator. Once the lens 40 is positioned, the adhesive 52 may be cured. In one embodiment, a low viscosity, ultraviolet (UV)-curing adhesive is preferred because it permits rapid curing through the lens 40 by illuminating the lens 40 with UV radiation. Using a low-viscosity adhesive aids in creating a small gap 80 (tantamount to a small glue thickness) and facilitates the lateral adjustment (horizontally along the distal surface of the ferrule 46) of the lens position (because of low frictional forces). The adhesive geometry is controlled during the application process so as to minimize a drift in pointing angle during cure. In one embodiment, the adhesive 52 is applied symmetrically around the lens center.

The gap 80 between the fiber 14 and the planar side of the lens 40 should be small. The beam 36 diverges from the fiber end due to diffraction of the nearly Gaussian beam that emanates from the fiber end 32. At the fiber end, the beam waist diameter may be roughly ten micrometers. The beam diverges only in the far-field 34 at a distance defined by the Rayleigh range for the particular fiber. In the near-field region 32 (within the Rayleigh range), the beam is roughly collimated with a beam diameter of approximately ten micrometers, for a standard single mode fiber (e.g., Corning SMF-28 or equivalent). If the gap 80 exceeds the axial range of the near-field region 32, there will be undesirable comatic aberration of the beam. For light with a wavelength of 1550 nanometers propagating in a standard single-mode fiber, the near-field limit is approximately fifty-five micrometers. Thus, if the gap 80 is well below fifty-five micrometers, the light coming out of the fiber 14 is not affected by the gap 80. If the gap 80 is significantly larger than fifty-five micrometers, the collimated light 36 will display comatic aberration. In one embodiment of the application, the gap 80 is held at or below ten microns.

Figure 3:
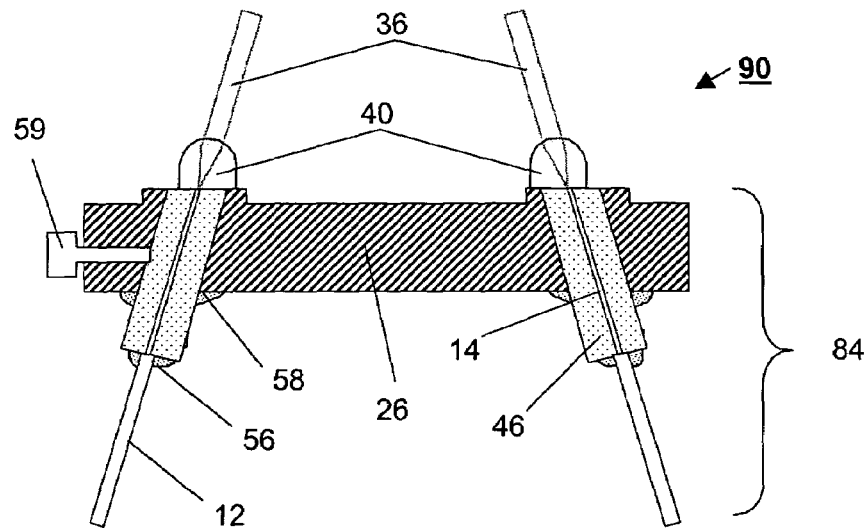
FIG. 3 illustrates a collimator array according to an embodiment of the present application.

FIG. 3 illustrates a plurality of collimators 10 integrated into a collimator array 90. The collimator array 90 comprises a fiber termination array 84 and one or more plano-convex lenses 40. In the embodiment shown in FIG. 3, fiber ferrules 46 are inserted into a substrate 26 and attached using adhesive 58. Fibers 14 are stripped of their buffer 12, inserted into the ferrules 46, and attached using adhesive 56. The distal ends of the fibers 14 are cleaved and the distal surface of the fiber array 84 is planar polished so as to make the ends of the ferrules 46 substantially even with the distal surface of the substrate 26. As shown in FIG. 3, some areas of the substrate 26 can be recessed in order to minimize the polishing area. Lenses 40 are attached to the fiber termination array 84 as described above, by repeated acts of dispensing adhesive 52 (FIG. 2), placing the lens 40, positioning the lens 40, and curing the adhesive 52.

In another embodiment, the fiber termination array 84 may be manufactured as described in co-assigned U.S. Pat. No. 6,595,698 B2, "HIGH DENSITY FIBER TERMINATOR/CONNECTOR," issued on Jul. 22, 2003, which is incorporated herein by reference in its entirety. Here, bare optical fibers are bonded into a low-cost, precision machined, silicon substrate. The substrate-fiber assembly is then polished using one of a number of planar polishing techniques. Plano-convex lenses 40 would be aligned and bonded to this fiber termination array 40 using repeated acts of adhesive dispensing, lens placement, lens positioning, and adhesive curing.

Although FIG. 3 only shows two collimators, the collimator array 90 may include more than two collimators. Every collimator in the array 90 can point in similar directions or different directions. The discrete pointing direction for each collimator is determined by a combination of the angle of the corresponding hole in the substrate 26, and by the position of the corresponding lens 40 with respect to the corresponding fiber 14.

In FIG. 3, if the adhesive 58 is not used, it is possible to use a substrate 26 to process a large number of individual collimators 10 together. In this embodiment, fiber ferrules 46 are inserted into a substrate 26 and attached using a mechanical means that is not permanent, such as using one or more set-screws 59. Fibers 14 are stripped of their buffer 12, inserted into the ferrules 46, and attached to the ferrules 46 using adhesive 56. The ends of the fibers 14 are cleaved. The fiber array is planar polished so as to make the distal ends of the ferrules 46 substantially even with the distal surface of the substrate 26. As shown in FIG. 3, some areas of the substrate 26 can be recessed in order to minimize the polishing area. Lenses 40 are attached to the fiber termination array 84 as described in the preceding description, by repeated acts of dispensing adhesive 52 (FIG. 2), placing lenses 40, positioning lenses 40, and curing the adhesive 52. Finally, the fiber ferrules 46 are released from the substrate 26 to provide individual collimators 10, as shown in FIG. 1. In this embodiment, it is important that the lenses 40 are smaller than the ferrules 46 so that after the lenses 40 are glued to the ferrules 46, it is possible to remove the individual collimators 10 (FIG. 1) from the substrate 26.

Figure 4:
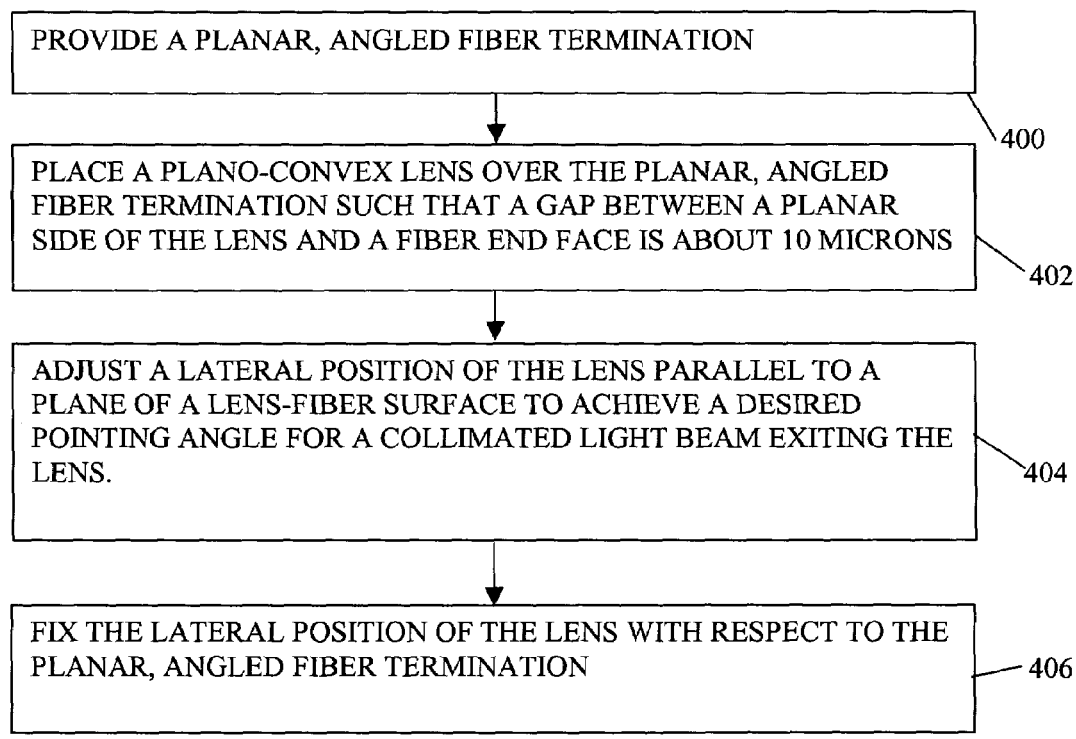
FIG. 4 illustrates a method according to an embodiment of the present application.

FIG. 4 illustrates a method according to an embodiment of the present application. The method collimates an optical beam by providing a planar, angled fiber termination at 400. The method places a plano-convex lens over the planar, angled fiber termination such that a gap between a planar side of the lens and a fiber end face is about 10 microns or less at 402. The method adjusts a lateral position of the lens parallel to a plane of a lens-fiber surface to achieve a desired pointing angle for a collimated light beam exiting the lens at 404. The method fixes the lateral position of the lens with respect to the planar, angled fiber termination at 406.

Although number of aspects have been described, it should be understood that various changes, combinations, substitutions and alterations may be made hereto without departing from the spirit and scope of the application as described by the appended claims. Accordingly, other aspects are within the scope of the following claims.

What is claimed is:

1. A collimator comprising:
    an optical fiber having an angled distal end;
    a ferrule having an angled end face, wherein an end portion of the optical fiber is inserted in the ferrule; and
    a plano-convex lens having a planar surface attached to the angled distal end of the ferrule, the plano-convex lens collimating a beam of light from the optical fiber, wherein the planar surface is parallel to the plane of the convex surface of the lens, wherein an air gap between the planar surface of the lens and a fiber end face is about 10 microns or less.

2. The collimator of claim 1, wherein the optical fiber is glued to the ferrule.

3. The collimator of claim 1, wherein the plano-convex lens is attached to the ferrule by a low viscosity, ultraviolet-curing adhesive.

4. The collimator of claim 1, further comprising a substrate with an angled hole shaped to fit the ferrule, the ferrule being inserted in the hole.

5. The collimator of claim 1, wherein an angle of the beam of light exiting the optical fiber is substantially equal to an angle of the beam of light exiting the plano-convex lens.

6. The collimator of claim 1, further comprising an anti-reflection layer on at least one of the angled distal end of the fiber, the planar surface of the lens, and the convex side of lens.

7. A method of collimating an optical beam comprising:
providing a planar, angled fiber termination;
providing a plano-convex lens having a planar surface and a convex surface, the planar surface parallel to the plane of the convex surface;
placing the planar surface of the plano-convex lens over the planar, angled fiber termination such that an air gap between the planar surface of the lens and a fiber end face is about 10 microns or less;
adjusting a lateral position of the lens parallel to a plane of a lens-fiber surface to achieve a desired pointing angle for a collimated light beam exiting the lens; and
fixing the lateral position of the lens with respect to the planar, angled fiber termination.

8. The method of claim 7, further comprising:
laterally aligning the plano-convex lens transverse to a fiber axis and with respect to the fiber end face to reduce optical aberrations in the collimated beam exiting the lens.

9. The method of claim 8, further comprising minimizing spherical aberration.

10. The method of claim 8, further comprising minimizing comatic aberration.

11. The method of claim 7, further comprising:
coating an anti-reflection layer on at least one of the fiber termination, the planar surface of the lens, and the convex side of the lens.

12. The method of claim 7, further comprising:
filling entirely the gap between the fiber termination and the planar surface of the lens with a transparent material.

13. The method of claim 7, further comprising:
moving a lens with at least one actuator with respect to the fiber termination.

14. The method of claim 7, further comprising:
adjusting the gap between the fiber termination and the lens to modify optical aberrations.

15. The method of claim 7, further comprising:
adjusting the gap between the fiber termination and the lens to modify a wavelength dependence of transmission and reflection.

16. The method of claim 7, comprising:
adjusting the lateral position of the lens with respect to the fiber termination to change a pointing angle of the collimated beam.

17. The method of claim 7, further comprising:
adjusting the lateral position of the lens with respect to the fiber termination to modify optical aberrations.

18. A method of collimating a plurality of optical beams comprising:
providing an array of angled polished fiber terminations;
providing at least one plano-convex lens having a planar surface and a convex surface, the planar surface parallel to the plane of the convex surface;
placing the planar surface of the at least one plano-convex lens on the angled fiber termination array such that a planar side of the lens has an air gap of about 10 microns or less to a fiber end face;
adjusting a lateral position of the lens parallel to a plane of a lens-fiber surface to achieve a desired pointing angle for a light beam exiting the lens; and
fixing the lateral position of the lens with respect to the fiber termination array.

19. A method of collimating an optical beam comprising:
providing an array of plano-convex lenses, wherein the planar convex lenses have planar surfaces and opposing convex surfaces, wherein the planar surfaces are parallel to the plane of the opposing convex surfaces;
placing an angle polished fiber termination under one of the planar surfaces of the plano-convex lenses such that an air gap between a planar side of the lens and a fiber end face is about 10 microns or less;
adjusting a lateral position of the fiber termination parallel to a plane of the lens-fiber surface to achieve a desired pointing angle for a light beam exiting the lens; and
fixing a position of the fiber termination.

* * * * *

UNITED STATES PATENT AND TRADEMARK OFFICE
CERTIFICATE OF CORRECTION

PATENT NO.        : 6,934,087 B1
APPLICATION NO. : 10/669676
DATED             : August 23, 2005
INVENTOR(S)       : Roman C. Gutierrez et al.

It is certified that error appears in the above-identified patent and that said Letters Patent is hereby corrected as shown below:

Column 2, line 44 delete "piano" and insert --plano--

Signed and Sealed this

Seventh Day of November, 2006

JON W. DUDAS
*Director of the United States Patent and Trademark Office*